United States Patent
McDonald et al.

(10) Patent No.: US 7,517,219 B2
(45) Date of Patent: Apr. 14, 2009

(54) METHOD OF PROVIDING SPECIALIZED DANCE VIDEOS

(76) Inventors: Michael McDonald, 18324 Oxnard St., Unit 1, Tarzana, CA (US) 91356; Janet Roston-Weiss, 427 S. Camden Dr., Beverly Hills, CA (US) 90212

( * ) Notice: Subject to any disclaimer, the term of this patent is extended or adjusted under 35 U.S.C. 154(b) by 784 days.

(21) Appl. No.: 10/783,909

(22) Filed: Feb. 20, 2004

(65) Prior Publication Data
US 2005/0186543 A1 Aug. 25, 2005

(51) Int. Cl.
*A63B 69/00* (2006.01)
*G09B 9/00* (2006.01)

(52) U.S. Cl. ........................ 434/250; 345/630
(58) Field of Classification Search ................ 434/250, 434/256, 257
See application file for complete search history.

(56) References Cited

U.S. PATENT DOCUMENTS

| | | | | |
|---|---|---|---|---|
| 2,554,941 | A * | 5/1951 | Dobrowsky | 84/94.2 |
| 4,602,286 | A * | 7/1986 | Kellar et al. | 348/597 |
| 5,595,389 | A * | 1/1997 | Parulski et al. | 463/31 |
| 5,623,587 | A * | 4/1997 | Bulman | 345/630 |
| 5,781,198 | A * | 7/1998 | Korn | 345/634 |
| 6,001,013 | A * | 12/1999 | Ota | 463/7 |
| 6,215,498 | B1 * | 4/2001 | Filo et al. | 345/419 |
| 6,227,974 | B1 * | 5/2001 | Eilat et al. | 463/40 |
| 6,306,036 | B1 * | 10/2001 | Burns et al. | 463/31 |
| 6,353,170 | B1 * | 3/2002 | Eyzaguirre et al. | 84/603 |
| 6,450,888 | B1 * | 9/2002 | Takase et al. | 463/43 |
| 6,758,756 | B1 * | 7/2004 | Horigami et al. | 463/43 |
| 6,894,686 | B2 * | 5/2005 | Stamper et al. | 345/419 |
| 7,117,136 | B1 * | 10/2006 | Rosedale | 703/7 |
| 2002/0007718 | A1 * | 1/2002 | Corset | 84/609 |
| 2006/0154220 | A1 * | 7/2006 | Toniolo | 434/250 |

FOREIGN PATENT DOCUMENTS

KR 20030039210 * 5/2003

OTHER PUBLICATIONS

Birthday Party Ideas, Carnival Parties 5yr, Jul. 2003, Http://www.birthdaypartyideas.com/html/carnival_parties_58.html. 4 pages.*
Wikimedia Commons, Image: 029251 reichenb holmes.jpg, Sep. 2002, 3 pages.*
The Hoagy Carmichael Collection, Nov. 1, 1999, 2 pages.*

* cited by examiner

*Primary Examiner*—Xuan M. Thai
*Assistant Examiner*—Kesha Y. Frisby
(74) *Attorney, Agent, or Firm*—Fulwider Patton LLP

(57) ABSTRACT

A musical video is made at a first time of a dancer whose head is stationary but whose feet and body are moving in synchronism with a dance song. The dancer's head is then removed from the video. At a festive occasion (e.g., a birthday party) at a subsequent time, the dance song is replayed and a video is made of the response of the head, in a stationary position, of one or more of the celebrants at the festive occasion to the dance song. The celebrant's head is combined with the dancer's body to produce two (2) videos are then combined into a single video in which the celebrant's head appears on the dancer's body.

5 Claims, 2 Drawing Sheets

METHOD OF PROVIDING SPECIALIZED DANCE VIDEOS

This invention relates to systems for, and methods of, producing specialized musical videos. The invention particularly relates to systems for, and methods of, producing specialized musical videos in which the specialized musical videos are produced at festive occasions to enliven the activities at the festive occasions.

BACKGROUND OF THE INVENTION

At festive occasions such as at birthday parties, baptisms and bar mitzvahs, there is always a need, or at least a desire, to have the celebrants participate in activities which will impart a joyous atmosphere to the occasion. For example, a master of ceremonies and a dance band are often provided to enliven the celebration. However, attempts are constantly being made to enliven the activities in new ways that have not previously been tried.

BRIEF DESCRIPTION OF A PREFERRED EMBODIMENT OF THE INVENTION

A musical video is made at a first time of a dancer whose head is stationary but whose feet and body are moving in synchronism with a dance song. The dancer's head is then removed from the video. At a festive occasion (e.g., a birthday party) at a subsequent time, the dance song is replayed and a video is made of the response of the head, in a stationary position, of one or more of the celebrants at the festive occasion to the dance song. The celebrant's head is combined with the dancer's body to produce two (2) videos are then combined into a single video in which the celebrant's head appears on the dancer's body.

DETAILED DESCRIPTION OF A PREFERRED EMBODIMENT OF THE INVENTION

Figure 1:
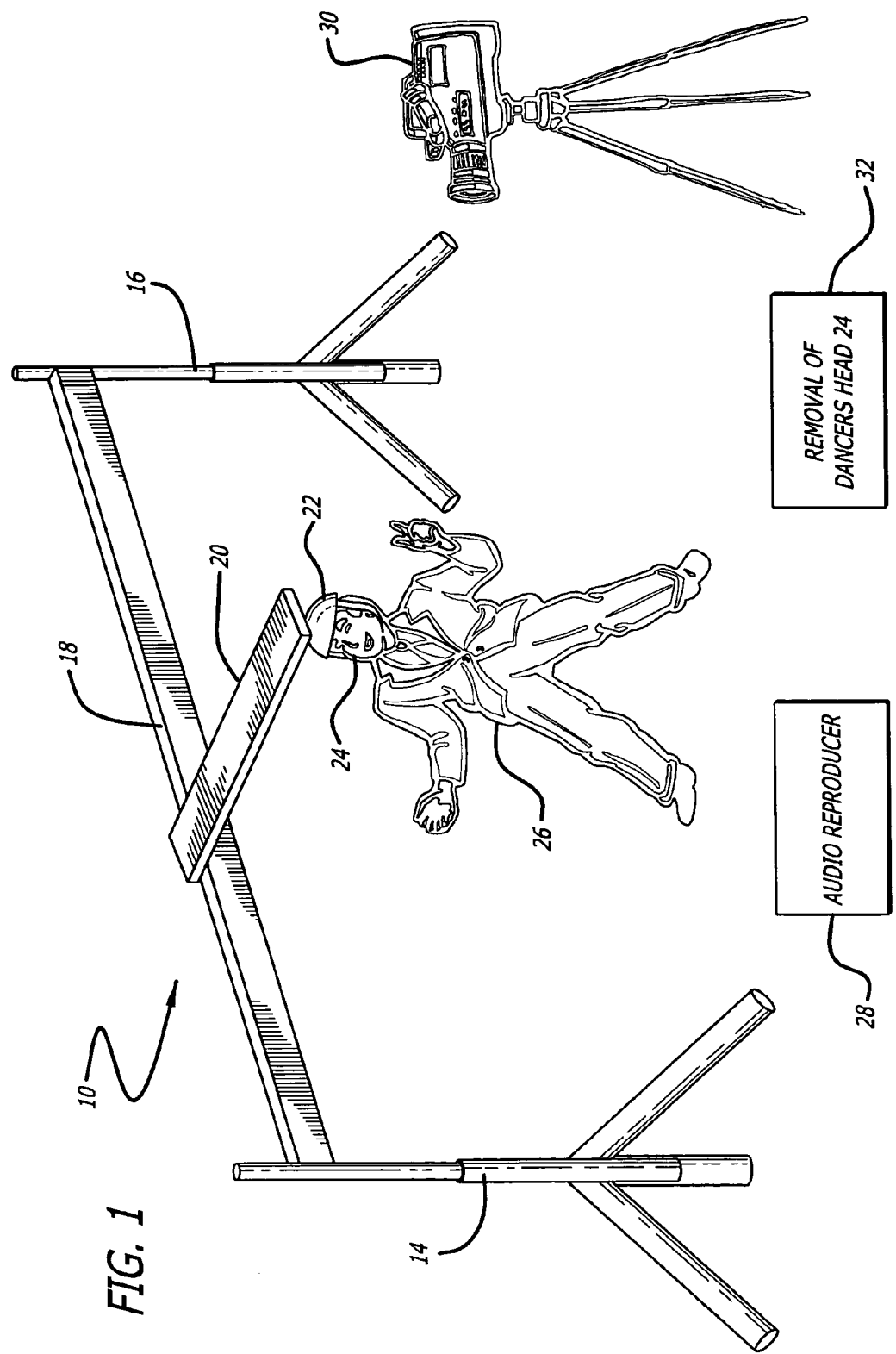
FIG. 1 is a schematic perspective view of an individual dancing with the individual's head in a stationary position and further indicates schematically a camera for producing a video of the movements of the dancer's body and feet in synchronism with the dance music and the removal of the dancer's head from the video.

In one embodiment of the invention, a fixture generally indicated at 10 in FIG. 1 is provided. The fixture includes a pair of spaced stanchions 14 and 16 for supporting a crossbar 18. A support 20 extends from the crossbar 18 in a direction transverse (preferably perpendicular) to the crossbar for holding a helmet 22. The helmet 22 is disposed on the head 24 of a dancer 26 in a substantially fixed and stationary position. However, the dancer's body and feet are capable of moving subject to the constraint imposed on the dancer's head by the helmet 22. Any number of dancers can be provided, each constrained in the manner shown in FIG. 1 and described above.

An audio reproducer 28 is provided for producing a dance song and the dancer 26 dances in response to the dance song. A movie camera 30 records in a video medium (e.g., a tape) the audio of the dance song and the dancer's physical response to the dance song. Another video is then provided in which the dancer's head is removed from the secondary as at 32. Alternatively, the camera 30 can record the image of the dancer's body but not the dancer's head.

Figure 2:
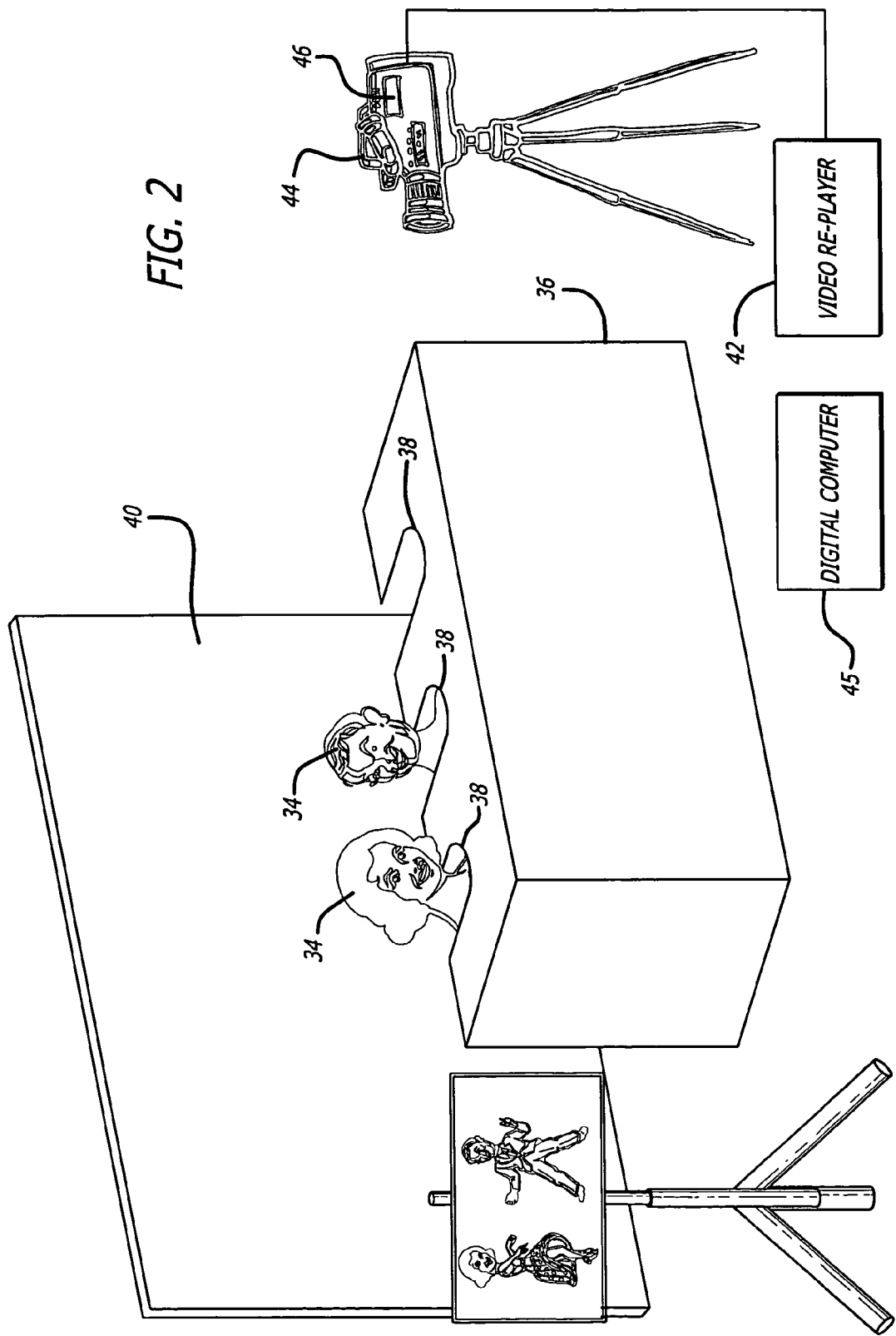
FIG. 2 is a schematic perspective view of a celebrant, or celebrants, at a festive occasion and illustrates how a video is taken of the dancers moving in synchronism with the dance music but with the celebrant's head replacing the dancer's head in the video.

At a subsequent time such as at a festive occasion, celebrants 34 sit in a foreground enclosure 36 in FIG. 2 with their bodies within the enclosure but with their heads exposed. The enclosure 36 may have a particular color such as green. Cut-outs 38 nay be provided in the foreground enclosure 36 in which the necks of the celebrants 34 may be disposed. The cut-outs 38 limit the lateral, longitudinal and vertical movements of the celebrants' heads. A background 40 may be disposed in back of the enclosure 36 and may also be provided with the particular color such as green.

The video previously recorded by the camera 30 in FIG. 1 is then replayed to the celebrants 34 or by a video replayer 42 so that the heads of the celebrants can respond to the music. The video replayer 42 is connected to a camera 44 to introduce the video recording in the replayer 42 to the camera 44. The camera 44 records the response of the heads of the celebrants 34 to the music in synchronism with the dance music and in synchronism with the movements of the body and legs of the dancers 26. In this way, the heads of the celebrants 34 became disposed on the bodies of the dancers 26, in place of the dancer's heads, so that the movements of the celebrants' head and the dancers' bodies are in synchronism with the dance music.

The camera 44 may be disposed closer to the celebrants 34 than the distance between the cameras 30 relative to the dancers 26. This tends to enlarge the heads of the celebrants 34 relative to the bodies and legs of the dancers 26. This enlargement is provided so that the heads of the celebrants 34 will always be disposed on the necks of the dancers 26 in the video recorded in the camera 44. A digital computer 45 may be provided to adjust for changes in the position of the dancer's body, thereby to align the dancer's body with the celebrant's head.

The camera 44 is provided with chromakey apparatus 46. The chromakey apparatus 46 eliminates the green color from the foreground enclosure 36 and the background 40 in the video being recorded in the camera 44. A different background may be recorded in the camera 44 in substitution for the green background 40. The resultant video recorded in the camera 44 may be provided as a gift to the celebrants 34 as a memento of the good time that they had at the festive occasion.

Although this invention has been disclosed and illustrated with reference to particular preferred embodiments, the principles involved are susceptible for use in numerous other embodiments which will be apparent to persons of ordinary skill in the art. The invention is, therefore, to be limited only as indicated by the scope of the appended claims.

The invention claimed is:

1. A method of creating a video dance routine, including steps of:

providing a dance routine with music, involving at least one dancer, physically restraining a positioning of the at least one dancer's head with a fixture and helmet worn by said dancer so that the at least one dancer's head remains substantially in a fixed position during the performance of the dance routine, wherein said fixture includes a pair of spaced stanchions for supporting a crossbar and a support which extends from the crossbar on which said helmet is attached, providing a video of the dance routine, with the music, showing a dancer's body but not the dancer's head, and movement of the dancer's body in synchronism with the music, disposing at least one celebrant's head in an opening in a foreground enclosure and limiting the movements of the at least one celebrant's head in lateral, longitudinal and vertical directions, recording a video appearance of the at least one celebrant's head in the opening during playing of the music to the at least one celebrant, and replacing the at least one celebrant's head in place of the at least one dancer's head at the positioning of the at least one dancer's head in the video of the dance routine to provide a video constituting a composite of the dancer's body and the at least one celebrant's head.

2. A method of creating a dance routine, including steps of:

restraining only a dancer's head with a fixture and helmet worn by the dancer to a substantially unitary lateral position while the dancer is performing a dance routine in synchronism with music, wherein said fixture includes a pair of spaced stanchions for supporting a crossbar and a support which extends from the crossbar on which said helmet is attached, providing a video and a synchronized audio recording on a medium capable of being duplicated, the video and the synchronized audio recording being of said dancer providing a dance routine with the dancer's head in the substantially unitary lateral disposition, removing the dancer's head from the video, substituting a celebrant's head on the dancer's body after removing the dancer's head from the dancer's body in the video, processing the substantially stationary lateral disposition and appearance of the celebrant's head on the dancer's body to assure that the celebrant's head is disposed on the dancer's neck, including limiting lateral, longitudinal and vertical movements of the celebrant's head on the dancer's body during performance of the dance routine by the dancer's body.

3. A method as set forth in claim 2, including the steps of:

providing the image of the celebrant's head in a background of a particular color so that only the celebrant's head is visible in the background of the particular color, and eliminating the background of the particular color from the image of the celebrant's head before the image of the celebrant's head is transferred to the dancer's body in replacement of the dancer's head, providing the image of the celebrant in a foreground of a particular color so that only the celebrant's head is visible in the foreground of the particular color, and eliminating the foreground of the particular color from the image of the celebrant's head before the image of the celebrant's head is transferred to the dancer's neck in replacement of the dancer's head.

4. A method as set forth in claim 3, including the steps of:

employing digitizing techniques to adjust for changes in the lateral position of the dancer's body, thereby to align the dancer's neck laterally with the celebrant's head, enlarging the celebrant's head relative to a dancer's head in the video image to insure that the celebrant's head is disposed laterally on the dancer's neck regardless of a displacement of the dancer's body laterally from a stable position, and providing an individualized background after the eliminating of the background of the particular color.

5. A method of creating a dance routine, including steps of:

providing a visual image and a synchronized audio recording on a medium capable of being duplicated, the visual image and the synchronized audio recording being of a dancer providing a dance routine with the dancer's head held in a substantially stationary lateral disposition with a fixture and a helmet worn by the dancer, wherein said fixture includes a pair of spaced stanchions for supporting a crossbar and a support which extends from the crossbar on which said helmet is attached, removing the dancer's head from the visual image, substituting a celebrant's head on the dancer's body after removing the dancer's head from the dancer's body in the visual image, substituting a celebrant's head on the dancer's body after removing the dancer's head from the dancer's body in the visual image, processing the substantially stationary lateral disposition and appearance of the celebrant's head on the dancer's neck, including limiting lateral, longitudinal and vertical movements of the celebrant's head on the dancer's body during performance of a dance routine by the dancer's body, providing the image of the celebrant in a foreground of a particular color so that only the celebrant's head is visible in the foreground of the particular color, and eliminating the foreground of the particular color from the image of the celebrant's head before the image of the celebrant's head is transferred to the dancer's body in replacement of the dancer's head.

* * * * *